(12) United States Patent
Smith

(10) Patent No.: US 10,534,080 B2
(45) Date of Patent: Jan. 14, 2020

(54) RADAR IMAGE FORMATION WITHIN A DISTRIBUTED NETWORK

(71) Applicant: THE BOEING COMPANY, Huntington Beach, CA (US)

(72) Inventor: Brian H. Smith, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 756 days.

(21) Appl. No.: 15/083,069

(22) Filed: Mar. 28, 2016

(65) Prior Publication Data

US 2017/0276786 A1 Sep. 28, 2017

(51) Int. Cl.
*G01S 13/90* (2006.01)
*G01S 13/89* (2006.01)
*G01S 7/00* (2006.01)

(52) U.S. Cl.
CPC .............. *G01S 13/90* (2013.01); *G01S 7/003* (2013.01); *G01S 13/89* (2013.01); *G01S 13/9021* (2019.05)

(58) Field of Classification Search
None
See application file for complete search history.

(56) References Cited

U.S. PATENT DOCUMENTS

| | | | |
|---|---|---|---|
| 5,093,563 A * | 3/1992 | Small .................... | G02B 27/58 250/201.9 |
| 5,812,704 A | 9/1998 | Pearson et al. | |
| 5,923,278 A * | 7/1999 | Poehler ............... | G01S 13/9023 342/191 |
| 9,239,384 B1 * | 1/2016 | Chow ................. | G06K 9/00637 |
| 9,523,768 B1 * | 12/2016 | Rincon ............... | G01S 13/9023 |
| 2004/0032361 A1 * | 2/2004 | Kirscht ............... | G01S 13/9029 342/25 R |
| 2008/0298392 A1 * | 12/2008 | Sanchez ............. | H04L 63/0245 370/469 |
| 2011/0163912 A1 * | 7/2011 | Ranney .................. | G01S 7/414 342/25 F |

* cited by examiner

*Primary Examiner* — Vladimir Magloire
*Assistant Examiner* — Donald H B Braswell
(74) *Attorney, Agent, or Firm* — Womble Bond Dickinson (US) LLP

(57) ABSTRACT

A system is provided for synthetic aperture radar image formation within a distributed network. A radar antenna receives successive echoes of a plurality of pulses of radio waves transmitted in an environment of a target. A processing system defines, from the successive echoes, an array of data elements representing a density of a reflective surface of the target at locations within the environment. The processing system also partitions the array into a plurality of subarrays based on a predefined array partitioning scheme. A respective node of a plurality of nodes receives and applies at least one algorithmic transform to a subarray of the plurality of subarrays, and determines a respective portion of a volume of space occupied by the target based thereon. The respective portion is combinable with other respective portions to determine the volume of space and thereby form an image of the target.

21 Claims, 9 Drawing Sheets

RADAR IMAGE FORMATION WITHIN A DISTRIBUTED NETWORK

GOVERNMENT LICENSE RIGHTS

This invention was made with Government support. The Government has certain rights in this invention.

TECHNOLOGICAL FIELD

The present disclosure relates generally to radar image formation and, in particular, to synthetic aperture radar image formation within a distributed network.

BACKGROUND

Various methods are utilized for image formation one of which includes imaging radar. Imaging radar can be used to create an image of an object including two-dimensional or three-dimensional representations of the object. In particular, imaging radar utilizes light to illuminate a target area within an environment and capture digital radar images at various radio wavelengths. The digital radar images are composed of a number of pixels, each pixel representing a reflection of radio waves at a respective area within the environment. The intensity of reflected signals, from the target area, is registered to determine an amount of electromagnetic scattering (e.g., light scattering) within the environment to form an image of the object (e.g., a landscape). The registered electromagnetic scattering is then mapped onto a two or three dimensional plane to create an image.

Current solutions for imaging radar require processing substantially large datasets to formulate such images. However, the current methods do not accommodate for timely and cost-effective processing of such large amounts of data. Therefore, it may be desirable to have a system and method that addresses at least some of these issues, and improves upon existing practices.

BRIEF SUMMARY

Example implementations of the present disclosure are directed to an improved system, method and computer-readable storage medium for radar image formation within a distributed network. In particular, large amounts of radar imaging data is distributed across a plurality of computational nodes for sequential processing. The subsequently processed data is combinable to form of an image. The present disclosure includes, without limitation, the following example implementations.

In some example implementations, a method is provided for radar image formation within a distributed network. The method comprises receiving, from a radar antenna, successive pulses of radio waves transmitted in an environment of a target. The method also comprises defining, from the successive recorded echoes, an array of data elements representing a density of a reflective surface of the target at each of a plurality of locations within the environment. The method also comprises partitioning the array into a plurality of subarrays based at least in part on a predefined array partitioning scheme. The method also comprises transmitting the plurality of subarrays to respective nodes of a plurality of nodes configured to apply at least one algorithmic transform to the plurality of subarrays and determine respective portions of a volume of space occupied by the target based thereon. The respective portions are combinable to determine the volume of space and thereby form an image of the target.

In some example implementations of the method of the preceding or any subsequent example implementation, or any combination thereof, defining the array includes defining the array in which the data elements are indexed based on corresponding wavenumbers of respective recorded echoes of the successive recorded echoes.

In some example implementations of the method of any preceding or any subsequent example implementation, or any combination thereof, defining the array includes being applying motion compensation, range interpolation or azimuth interpolation to the successive recorded echoes and thereby producing reformatted successive recorded echoes, and defining the array from the reformatted successive recorded echoes.

In some example implementations of the method of any preceding or any subsequent example implementation, or any combination thereof, partitioning the array into the plurality of subarrays includes partitioning the array into the plurality of subarrays each of which includes data elements of the array, and two or more of which include common data elements of the array such that the two or more at least partially overlap.

In some example implementations of the method of any preceding or any subsequent example implementation, or any combination thereof, the method further comprises, at the respective node, partitioning the subarray into a plurality of sub-subarrays based at least in part on a secondary predefined array partitioning scheme, and transmitting the plurality of sub-subarrays to further respective nodes of the plurality of nodes configured to apply the at least one algorithmic transform to the plurality of sub-subarrays and determine respective sub-portions of the respective portion of the volume of space occupied by the target based thereon. The respective sub-portions are combinable to determine the respective portion.

In some example implementations of the method of any preceding or any subsequent example implementation, or any combination thereof, applying the at least one algorithmic transform includes applying the at least one algorithmic transform in parallel with further respective nodes configured to receive further subarrays of the plurality of subarrays and simultaneously determine respective portions of the volume of space occupied by the target.

In some example implementations of the method of any preceding or any subsequent example implementation, or any combination thereof, the at least one algorithmic transform includes at least one of a warping transform, an autofocus transform, or a Fast Fourier transform (FFT), and the FFT includes at least one of a range transform or azimuth transform.

In some example implementations, a system is provided for radar image formation within a distributed network. The system includes a number of subsystems, such as a radar antenna, a processing system, and a plurality of nodes forming a distributed network which is configured to at least perform the method of any preceding example implementation, or any combination thereof.

In some example implementations, an apparatus is provided for radar image formation within a distributed network. The apparatus comprises a processor and a memory storing executable instructions that, in response to execution by the processor, cause the apparatus to implement the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

FIGS. 2-11 illustrate an array of data elements and various partitions thereof, according to example implementations of the present disclosure;

DETAILED DESCRIPTION

Figure 1:
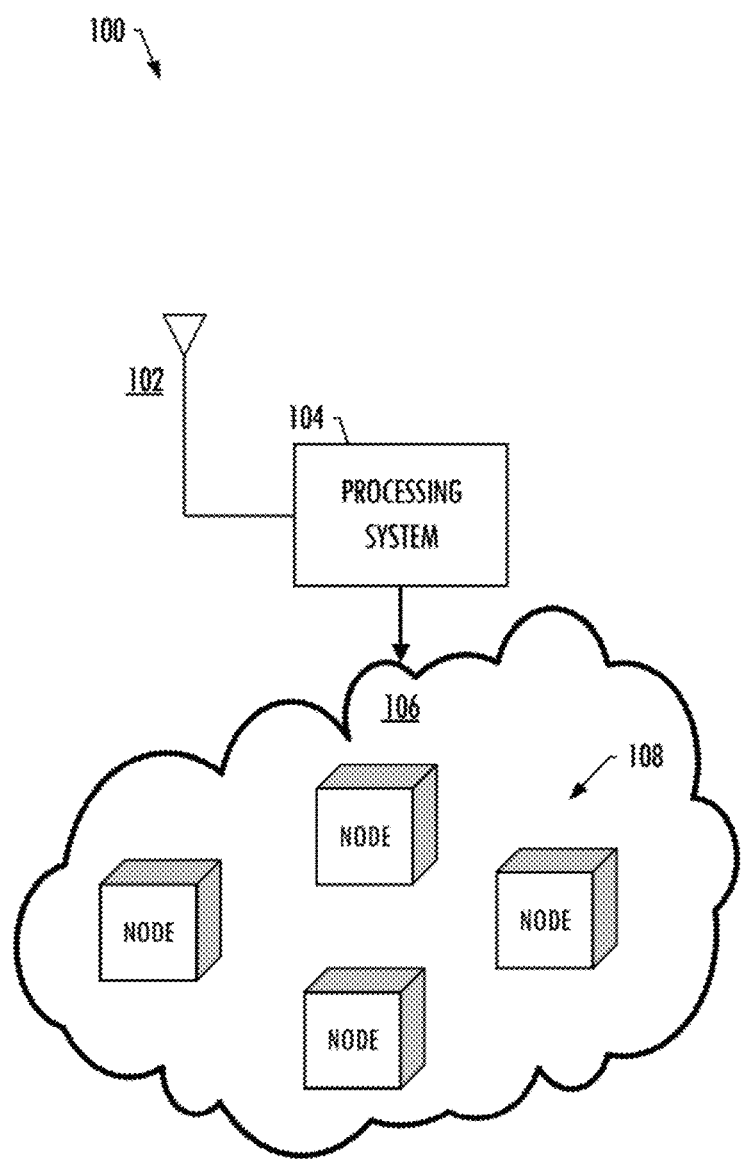
FIG. 1 is an illustration of a system for radar image formation within a distributed network, according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like. Unless otherwise stated, any one or more if not all of these may be absolute or approximate to account for acceptable variations that may occur, such as those due to engineering tolerances or the like. Like reference numerals refer to like elements throughout.

Example implementations of the present disclosure are generally directed to radar image formation and, in particular, to processing data within a distributed network for radar image formation. Example implementations will be primarily described in conjunction with radar image formation. It should be understood, however, that example implementations may be utilized in conjunction with a variety of other applications such as signal processing, tomography, large scale simulations, discrete simulations, finite element analysis, machine learning techniques, and/or other applications that require processing large, multi-dimensional arrays.

FIG. 1 illustrates an exemplary system 100 for radar image formation within a distributed network according to example implementations of the present disclosure, which may be simply referred to as the "system" herein. The system is configured to perform a number of different functions or operations, either automatically, under direct operator control, or some combination of thereof. In this regard, in some examples, the system is configured to perform one or more of its functions or operations automatically, that is, without being directly controlled by an operator. Additionally or alternatively, in some examples, the system is configured to perform one or more of its functions or operations under direct operator control.

The exemplary system 100 is configured to distribute large amounts of radar imaging data across a plurality of computational nodes for sequential processing. The subsequently processed data is combinable to form of an image. Accordingly, the system facilitates reducing the storage space required at an individual node and also facilitates reducing the overall computing time to generate an image or perform related data processing.

The system 100 includes one or more of each of a number of different subsystems (each an individual system) coupled to one another for performing one or more functions or operations. As shown in FIG. 1, for example, the system includes a radar antenna 102, a processing system 104, and a distributed network 106 of a plurality of nodes 108 that are coupled to the processing system and/or one another. Although shown as being separate from but coupled to the distributed network, in some examples, the processing system is part of the distributed network. Further, although shown as part of the system, in some alternative examples, one or more of the radar antenna, processing system, distributed network, or one or more nodes of the distributed network are instead separate from but in communication with the system. It should also be understood that, in some examples, one or more of the subsystems function or operate as a separate system without regard to others of the subsystems. And further, it should be understood that, in some examples, the system includes one or more additional or alternative subsystems than those shown in FIG. 1.

In one implementation, the distributed network 106 includes a plurality of nodes 108 networked together and configured to perform similar computing tasks in parallel and/or sequentially for solving the same computational task or a portion thereof. It should be noted that although, in the illustrated example, the plurality of nodes include four nodes, in other examples the plurality of nodes include any number of nodes to form the distributed network. Further each node of the plurality of nodes is communicably coupled to the processing system 104 and the other nodes within the distributed network. As such, the processing system 104 is configured to directly transmit information to each node of the plurality of nodes, and the nodes are configured to directly receive from and/or transmit information to each of the other nodes within the distributed network.

As explained in greater detail below, the radar antenna 102 is configured to receive successive echoes of a plurality of pulses of radio waves transmitted in an environment of a target. The processing system 104 is operatively coupled to the radar antenna and generally configured to define, from the successive echoes, an array of data elements representing a density of a reflective surface of the target at each of a plurality of locations within the environment. The processing system is also configured to partition the array into a plurality of subarrays based at least in part on a predefined array partitioning scheme. A respective node of the plurality of nodes 108 is configured to receive and apply at least one algorithmic transform to a subarray of the plurality of subarrays. The respective node is also configured to determine a respective portion of a volume of space occupied by the target based thereon, the respective portion is combinable with other respective portions to determine the volume of space and thereby form an image of the target. It should be noted that although the example implementations herein may be discussed with reference to a respective node of the plurality of nodes, each of the plurality of nodes are configured to perform the method or functions discussed herein (e.g., receive, apply algorithmic transforms to, partition, and transmit subarrays) in parallel or sequentially with other nodes of the plurality of nodes.

As indicated above, the radar antenna 102 is configured to receive successive echoes of a plurality of pulses of radio waves transmitted in an environment of a target. In some examples, the radar antenna is or includes a reflector antenna, an electronically-steerable array antenna, a single beam-forming antenna, or another suitable antenna not explicitly stated herein. In some examples, the radar antenna transmits the pulses of radio waves for illuminating the environment of the target. Upon reaching a surface of the target within the environment, the pulses generate echoed signals in which the radar antenna receives and records the successive echoes. In some examples, the radar antenna is mounted to an aircraft or spacecraft vehicle such that, as the vehicle moves, the radar antenna's location relative to the target changes and the echoes reflect a plurality of locations within the environment relative to the target.

The processing system 104 is operatively coupled to the radar antenna 102 for receiving echoes of the transmitted radio waves. The processing system is configured to define, from the successive echoes, an array of data elements representing the density of a reflective surface of the target at each of a plurality of locations within the environment. In some examples, the processing system is configured to apply motion compensation, range interpolation or azimuth interpolation to the successive recorded echoes and thereby produce reformatted successive recorded echoes, and define the array from the reformatted successive recorded echoes.

Figures 2, 3:
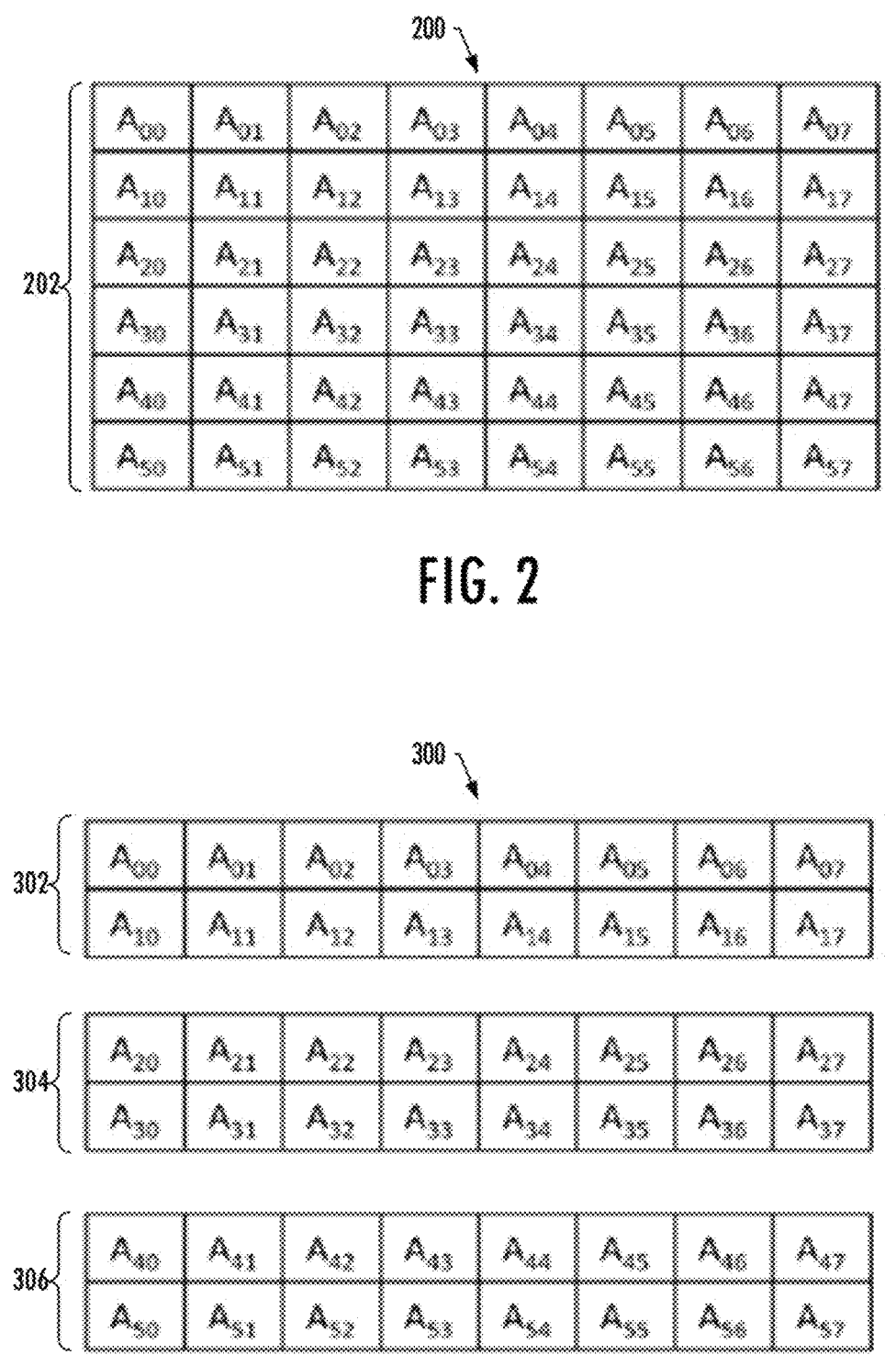

As discussed herein, an array refers to a data structure including a number of data elements that are identified by one or more indices. The individual elements are, or include, a floating point value, complex value, or another suitable datatype. In some examples, the number of indices defines a dimension of the data array in which each index has a range of allowable integer values. FIG. 2 illustrates a suitable two-dimensional data array 200 including a plurality of data elements 202 according to example implementations of the present disclosure. In the illustrated implementation, each of the data elements 202 is represented using an individual data element label, e.g. $A_{00} \ldots A_{57}$ based on a zero indexing scheme. In another option, each data element 202 may be indexed using a Cartesian coordinate system wherein the data elements 202 are denoted by the three indices such as $A_{ijk}$ in which the variables i, j, and k represent coordinate values in the Cartesian system.

In another example, the processing system 104 defines the data array 200 such that the data elements 202 are indexed based on corresponding wavenumbers of respective echoes of the successive echoes. For instance, in one example, the data elements $A_{00}$-$A_{07}$ of the two-dimensional array of FIG. 2 respectively represent the first through the eighth successive echoes as the array includes a zero-offset index. More specifically, $A_{00}$ represents a value of the first echo received by the array 200, $A_{01}$ represents a value of the second echo, and $A_n$ represents a value of the nth echo received by the array 200.

After defining the data array, the processing system 104 then partitions the array 200 into a plurality of subarrays 300 based at least in part on a predefined array partitioning scheme. In some examples, the partitioning scheme is defined based on data layout requirements for a particular algorithmic transform. For example, some filtering operations require data to be continuous in rows or columns. Other operations require data to overlap between subarrays to provide knowledge of nearby data values.

Figures 4, 5:
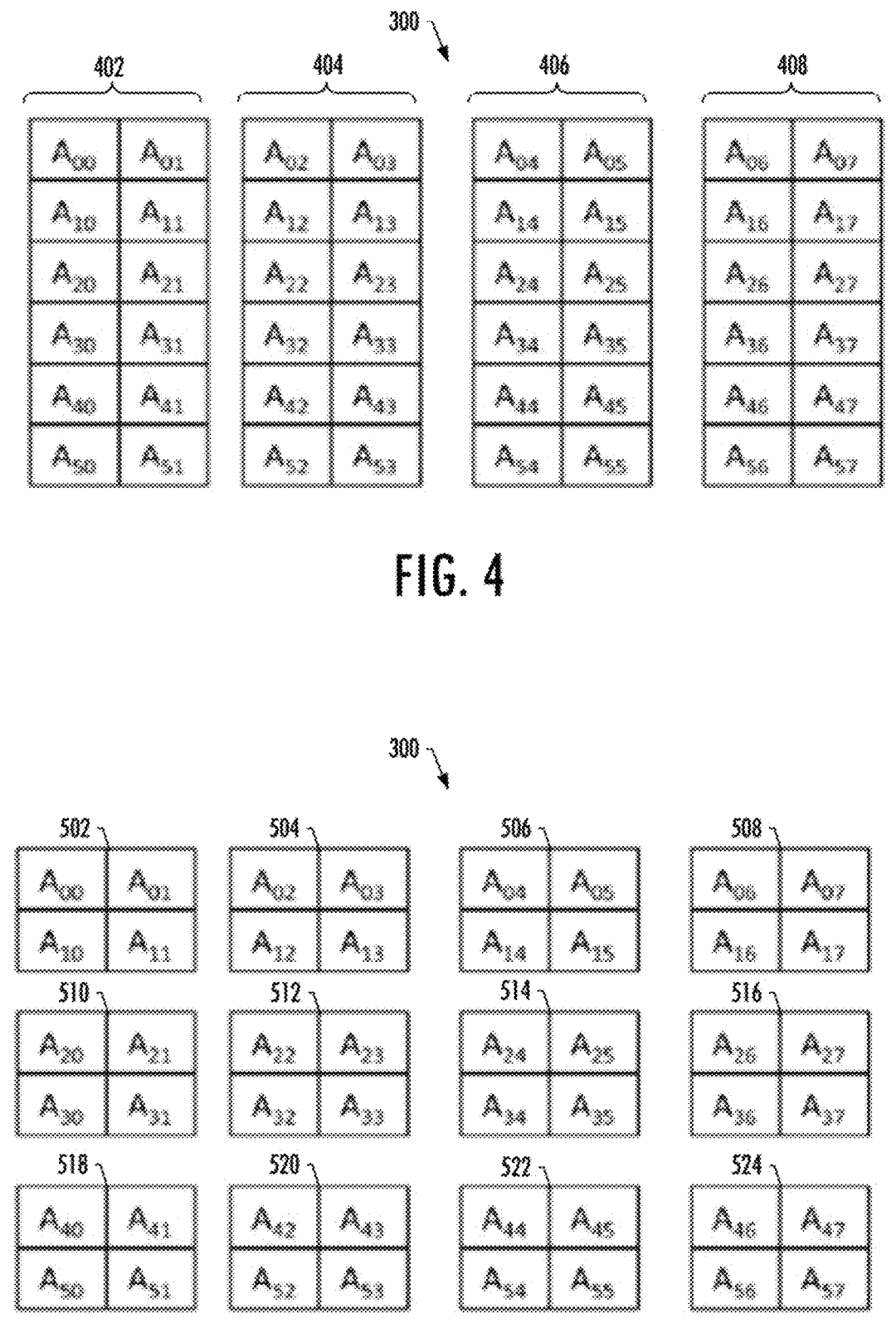

FIGS. 3-7 illustrate various suitable partitioning schemes according to example implementations of the present disclosure. For example, in some implementations, the partitioning scheme includes partitioning the array 200 into subarrays 300 having data elements 202 grouped into regular rectangular blocks of data (e.g., a series of rectangular blocks, approximately of the same size) for each subarray, as shown in FIGS. 3-5. In particular, FIG. 3 illustrates the array 200 being partitioned into a plurality of subarrays 300 based on a row-wise partitioning scheme and including three subarrays 302, 304, 306. The row-wise partitioning scheme is beneficial for transforms that require contiguous rows, such as a Fast Fourier transform (FFT) in the row direction. FIG. 4 illustrates the array 200 being partitioned into a plurality of subarrays based on a column-wise partitioning scheme, and including four subarrays 402, 404, 406, 408. FIG. 5 illustrates the array 200 being partitioned into a plurality of subarrays based on a hybrid partitioning scheme, and including three row-wise partitions and four column-wise partitions that define a total of twelve subarrays 502, 504, 506, 508, 510, 512, 514, 516, 518, 520, 522, 524.

Figure 6:
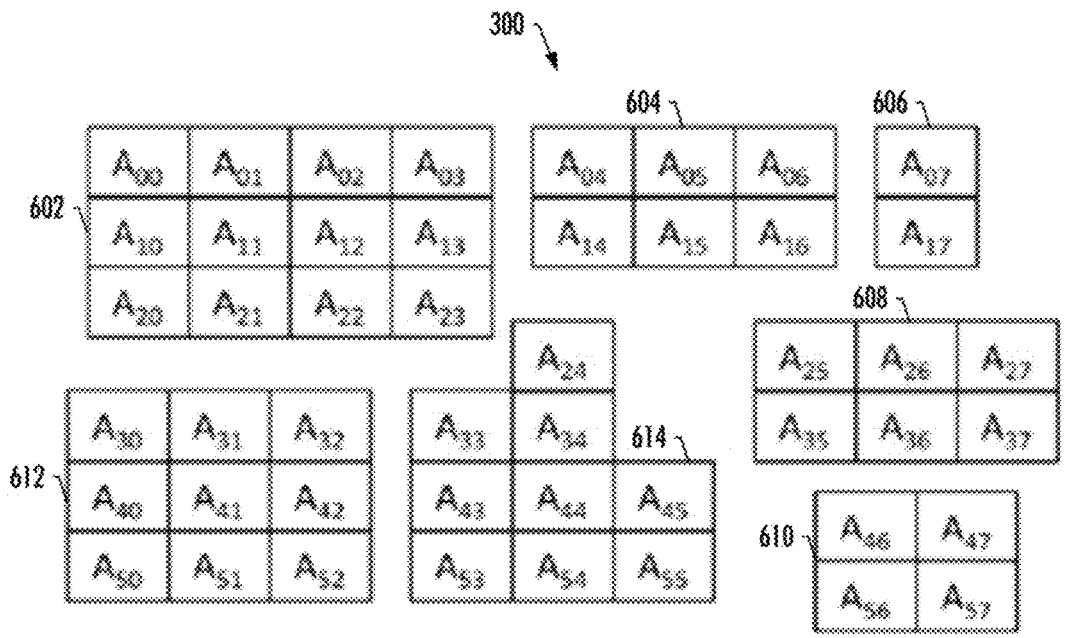

In another example, the partitioning scheme defines that the partitioning includes partitioning the array 200 into a plurality of subarrays 300 that include irregularly shaped blocks for at least some of the subarrays, as shown in FIG. 6. In particular, FIG. 6 illustrates the array 200 being partitioned into seven subarrays including six subarrays 602, 604, 606, 608, 610, 612 defined by regular-shaped blocks, and one subarray 614 defined by an irregularly-shaped block. In some examples, irregularly shaped/sized blocks are used for distributing data to computational nodes that have a greater capacity than other nodes, or for distributing regions of data that require more intensive processing than other regions.

Figure 7:
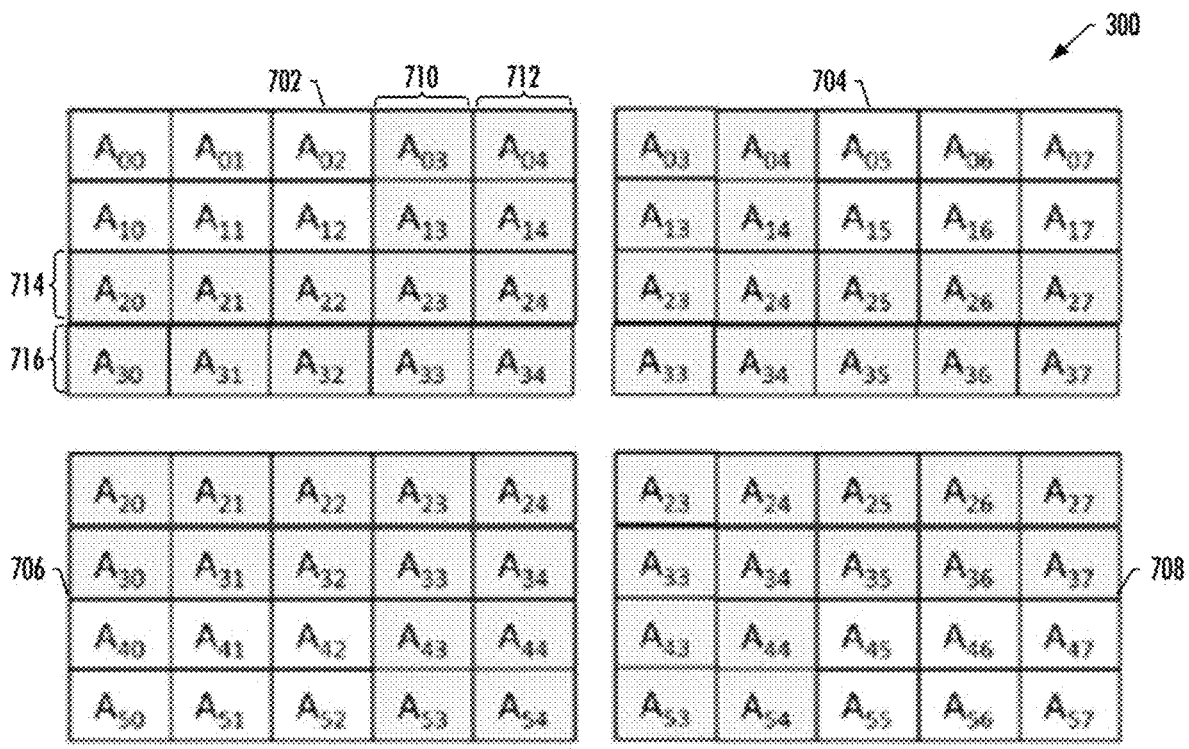

In some examples, the processing system 104 is configured to partition the array 200 into a plurality of subarrays 300 wherein each of the subarrays partially overlaps with the other subarrays as shown in FIG. 7. In particular, FIG. 7 illustrates the array being partitioned into four overlapping subarrays 702, 704, 706, 708 with respective shaded regions that indicate data elements included in more than one subarray. In the illustrated example, each subarray has two columns and two rows that overlap with an adjacent subarray. For example, the subarray 702 includes two columns 710 and 712 that also form part of an adjacent subarray 704. Similarly, the subarray 702 includes two rows 714 and 716 that also form part of another adjacent subarray 706. In this manner, each of the subarrays is formed including elements that overlap with the other subarrays. It should be realized that although the illustrated implementations shows each subarray having two overlapping rows and columns, that the subarray could be configured to have a single overlapping row and column or three (3) or more overlapping rows and columns.

In some examples, the parameters for partitioning the data array 200 into a plurality of subarrays 300, or otherwise the partitioning schemes, are defined based at least in part on the algorithmic transform to be utilized for processing the data of the array. For example, in some implementations, the partitioning scheme specifies partitioning the data array into row-wise subarrays (e.g., subarrays 302, 304, 306) for algorithmic transforms that require continuity in the column direction (e.g., row FFT). Alternatively, in some examples the partitioning scheme specifies partitioning the data array into column-wise subarrays (e.g., subarrays 402, 404, 406, 408) for algorithmic transforms that require continuity in the row direction (e.g., column FFT).

Additionally, in some examples, the partitioning scheme specifies partitioning the data array 200 into rectangular subarrays 300 (e.g., subarrays 502-524) for algorithmic transforms that require local data continuity (e.g., atmospheric compensations and object searches via machine vision algorithms). Further in some examples, the partitioning scheme specifies partitioning the data array 200 into overlapping subarrays (e.g., subarrays 702, 704, 706, 708) for algorithmic transforms that require local continuity in either the row or column direction (e.g., a Finite Impulse Response filter). As such, in some example implementations, the system is configured to identify at least one algorithmic transform to be used for processing the data, and define a partitioning scheme based at least in part on the data continuity requirements of the at least one algorithmic transform.

In some examples, the parameters for partitioning the data array 200 into a plurality of subarrays 300 (e.g., the size of the subarray including the number of rows and/or columns within the subarray, or shape of the subarray including regular and/or irregularly grouped blocks of data elements 202) are defined to optimize overall processing performance. For example, partitioning the data array into a large number of subarrays results in each subarray including a fewer number of data elements thereby allowing more nodes to process the data in parallel.

It should be noted that although the partitioning schemes are illustrated herein with reference to a two-dimensional array, the partitioning schemes are applicable to arrays of greater than two dimensions. For instance, in some examples, the data array is three or more dimensions. In these examples, partitioning the data array includes partitioning the data array using a cubed and/or hyper-cubed tiling having higher than two dimensions. For example, within the context of multi-channel radar, the successive echoes are received from multiple channels such that the processing system 104 defines a three-dimensional array.

In some examples, each subarray is stored on a different node of the plurality of nodes 108. Thus, in the exemplary implementation, if the system 100 includes n nodes 108, the array 200 is partitioned into n subarrays 300. Accordingly the processing system 104 is also configured to transmit each of the subarrays to respective nodes 108 of the plurality of nodes. Upon receiving a subarray, the respective node is configured to receive and apply at least one algorithmic transform to the subarray. The respective node is also configured to determine a respective portion of a volume of space occupied by the target based on the application of the algorithmic transform to the subarray. The respective portion is combinable with other respective portions (processed by further respective nodes of the plurality of nodes) to determine the volume of space and thereby form an image of the target.

In some examples, the algorithmic transform includes an FFT, and the FFT includes at least one of a range transform or azimuth transform. In some implementations, the algorithmic transform includes a resampling or warping operation. For instance, within the context of polar format processing, the data array is resampled in multiple dimensions in which the resampling warps the data into a new coordinate system using, for example, a finite impulse response filter. In these instances, a first axis is initially resampled, and a second axis is subsequently resampled. In some example implementations, the at least one algorithmic transform also includes an image rectification transform such as georectification. In these examples, the data array is warped to map coordinates (e.g., latitude and/or longitude) of the resulting image that is formed therefrom. In these examples, the algorithmic transform is applied to, and/or results in, one or more irregularly-shaped blocks as the coordinate mapping is based on terrain elevation, for instance.

In some implementations, the algorithmic transform also includes an autofocus operation. For example, the autofocus is applied during radar image formation to remove and/or correct phase errors due to atmospheric distortions and motion effects. As such, the autofocus operation facilitates generating sharper and more accurate images. In some examples, an image will appear blurred prior to application of the autofocus operation, and the autofocus operation provides phase information to reform the image locally and thereby make the sharper image. In some of these examples, differing corrections are applied to different regions of the data to account for differences in the environment or atmosphere that the radio waves propagated through to reach the target within the location corresponding to the region of data.

In some examples, each of the respective node(s) of the plurality of nodes 108 is configured to apply at least one algorithmic transform in parallel with the other nodes which are configured to receive further subarrays of the plurality of subarrays and simultaneously determine respective portions of the volume of space occupied by the target. For example, once the array 200 is partitioned into subarrays 300, the subarrays are processed in parallel across the plurality of nodes by mapping an algorithmic transform and applying it to each of the subarrays. As discussed herein, mapping refers to the process of applying an operation or function to various elements of a sequence (e.g., subarrays of the data array) which in some instances the operation or function is applied to the elements in sequentially or parallel. In particular, mapping refers to the process of applying the same operation in an identical manner to a collection of data (e.g., subarrays of the data array). In some examples, a resampling or warping operation is mapped across the plurality of nodes such that the operation is applied to each of the subarrays in parallel. In another example, an autofocus operation is mapped across the plurality of nodes in which the autofocus operation facilitates estimating and/or correcting for phase errors on sub-patches of the image. In these example implementations, the subarrays are initially repartitioned into rectangular blocks as opposed to rows or columns.

Accordingly, a number of processing operations are sequentially applied to the subarrays 300 at the respective nodes of the plurality of nodes 108. In at least these examples, the array 200 is repartitioned between these sequences to a new or secondary partitioning scheme for the next operation in the sequence. For instance, as previously indicated, in some examples, the algorithmic transform includes an autofocus operation. In these examples, the subarrays of the data array are repartitioned into rectangular blocks, and the nodes of the plurality of nodes in parallel, estimate and apply a phase error compensation to correct for atmospheric distortions on each rectangular block. In particular, each subarray represents a different portion of the environment or the target therein such that the error estimation and correction is specific for each subarray although the compensation of all the subarrays is performed in parallel by the respective nodes. In some other example implementations, the subarrays are repartitioned in instances when two or more different algorithmic transforms are applied in sequence (e.g., a range FFT, followed by and azimuth FFT).

In some examples, respective nodes of the plurality of nodes 108 are configured to partition a subarray of the plurality of subarrays 300 into a plurality of sub-subarrays (e.g., sub-subarrays 1000) based at least in part on a secondary predefined array partitioning scheme. The respective node then transmits the plurality of sub-subarrays to further respective nodes of the plurality of nodes configured to apply the at least one algorithmic transform to the plurality of sub-subarrays and determine respective sub-portions of the respective portion of the volume of space occupied by the target based thereon. The respective sub-portions are combinable to determine the respective portion of the volume of space occupied by the target.

In these examples, each respective node of the plurality of nodes 108 is configured to build one or more subarrays from the partitioned sub-subarrays. In some instances, the system may assign each node an indexed subarray for subsequent build, and in other instances, a node may compute the indexed subarray to be built based on an algorithmic process. Further in these examples, each node is configured to only receive the sub-subarrays necessary to build the assigned indexed subarray.

The transmission of subarrays 300 between respective nodes of the plurality of nodes 108 facilitates an increased processing speed by eliminating the need for transmission of each individual subarray back to a central node for repartitioning and redistribution. In some examples, the respective nodes comprise one or more network connections that are arranged in various topology configurations as subnets such that different node pairs use different subnets, and allow for a faster aggregate transfer rate as opposed to using a single node and having the transfer rate limited by the network speed of that single node.

In some examples, the partitioning scheme is based on a source partitioning scheme, and the secondary partitioning scheme is based on a destination partitioning scheme. FIGS. 8-11 illustrate suitable source and destination partitioning schemes according to example implementations of the present disclosure. With reference to these examples, and as discussed hereinafter, the number 800 of subarrays (that may be referenced as source subarrays 802) resulting from the initial partition of the array 200 is denoted as N, and the source subarrays 804, 806, 808 are respectively labeled as $P_0$, $P_1$ and $P_2$. Similarly, the number 900 of desired subarrays (that may be referred to as destination subarrays 902) of the array is denoted as M, and the destination subarrays 904, 906 are respectively labeled as $Q_0$ and $Q_1$.

Figures 8, 9:
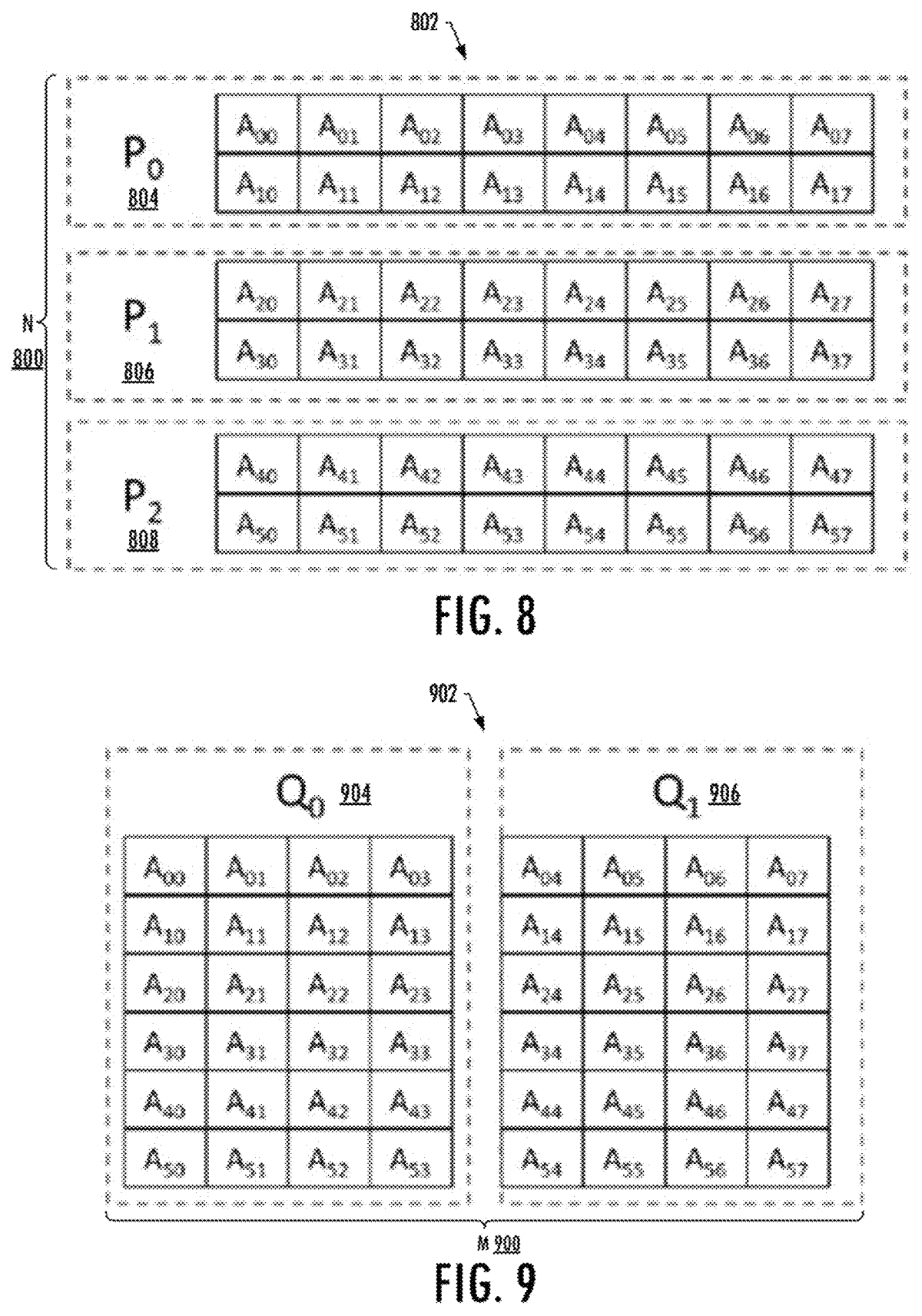

As indicated above, the partitioning parameters or partitioning scheme for the source 802 and/or destination 902 subarrays is defined based on various factors including continuity requirements of an algorithmic transform to be applied or for optimal performance specification. Accordingly, FIG. 8 illustrates the array 200 being partitioned based on an example source partitioning scheme, and including three subarrays 804, 806, 808. FIG. 9 illustrates a desired array being partitioned based on an example destination partitioning scheme, and including two subarrays 904, 906.

Figure 10:
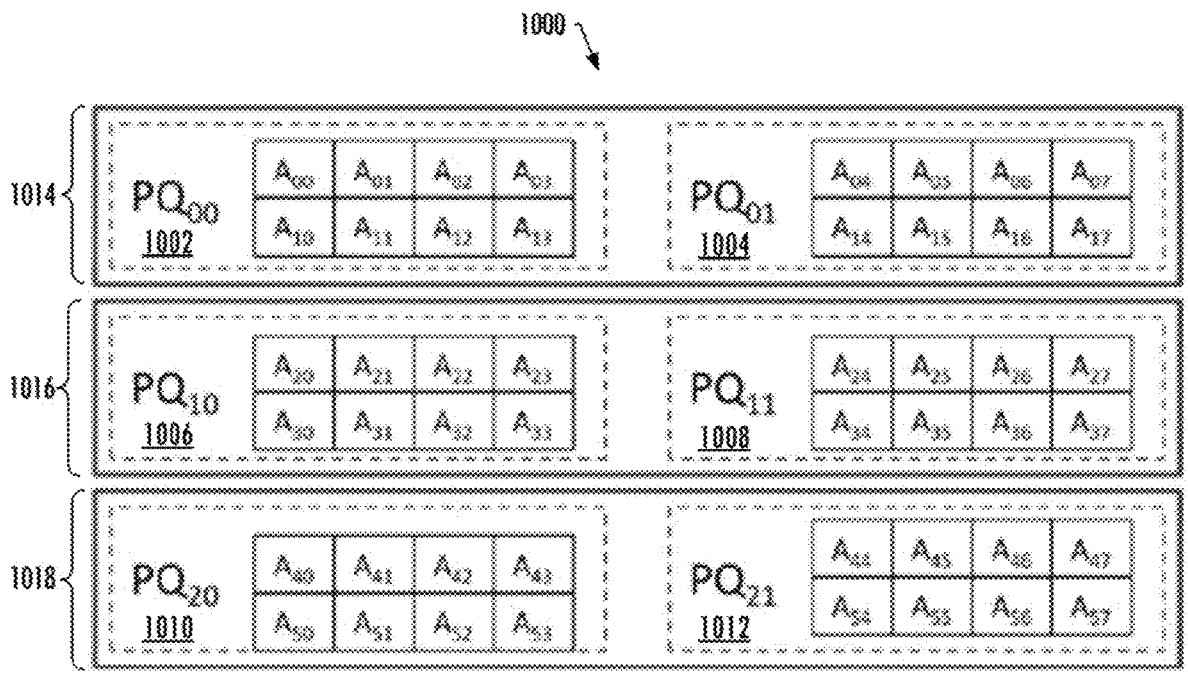

In these examples, the respective node of the plurality of nodes 108 being configured to partition the subarray (e.g., subarray 802) into a plurality of sub-subarrays 1000 includes computing the overlap with each desired subarray 902 for each source subarray 802, and extracting the sub-subarrays 1002, 1004, 1006, 1008, 1010, 1012 that are respectively labeled as $PQ_{00}$-$PQ_{21}$, and containing the region of overlap for the corresponding pair of source and destination subarrays in which there are up to N×M sub-subarrays 1000. FIG. 10 illustrates an example of suitable sub-subarrays in which the sub-subarrays within each respective group 1014, 1016, 1018 are located on the same node. In some examples, this process is implemented in parallel via a map operation.

Figure 11:
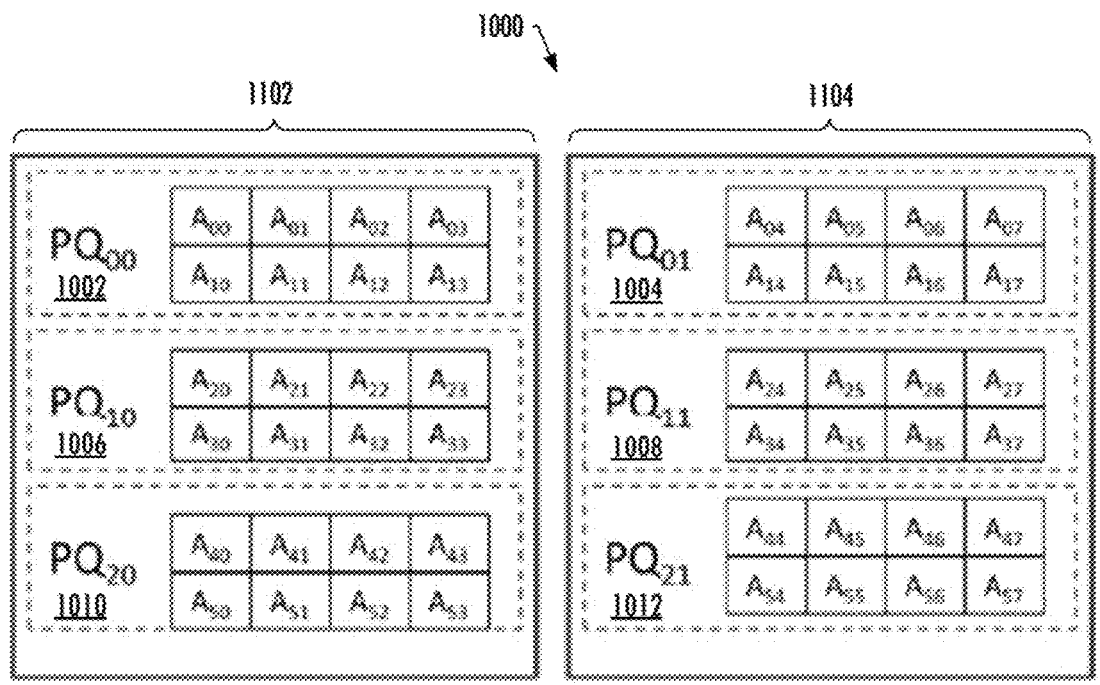

Further, the respective node of the plurality of nodes 108 being configured to transmit the plurality of sub-subarrays 1000 to the further respective nodes includes transmitting the sub-subarrays such that the portions of each destination subarray are stored on a common node. The transmitted sub-subarrays are then combined to generate the destination subarray 902 having the desired partitioning scheme. For example, as shown in FIG. 11, the sub-subarrays 1000 necessary to generate a given destination subarray 902 are transmitted such that they are in a respective group 1102 on the same computational node, the remaining sub-subarrays being transmitted with respect to another grouping 1104 to form another destination subarray 904. In some examples, this process is implemented via peer-to-peer transfer between nodes of the plurality of nodes.

Figure 12A:
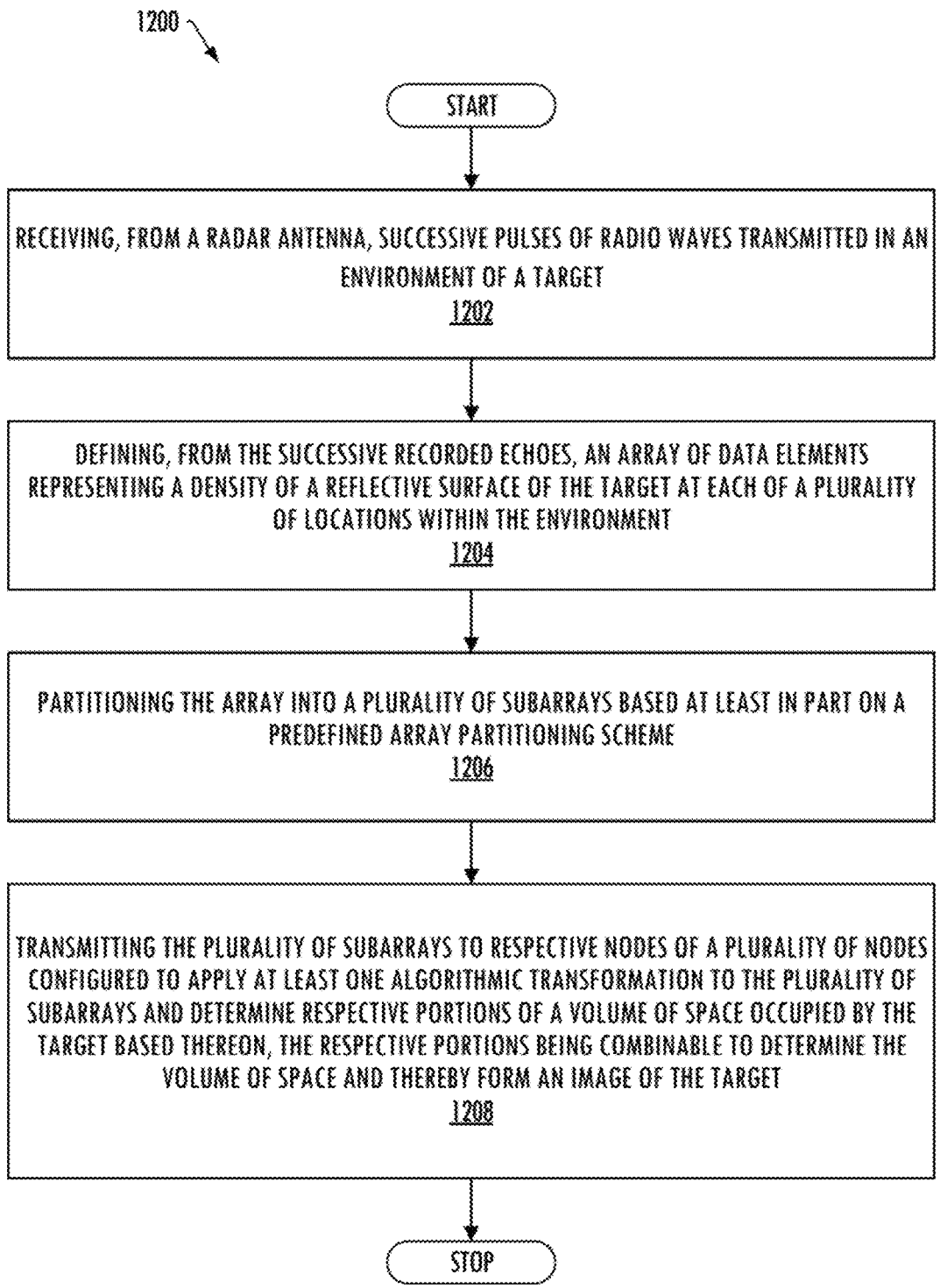
FIG. 12A is a flow diagram illustrating various operations of a method for radar image formation within a distributed network, according to example implementations of the present disclosure.

FIG. 12A illustrates a flowchart including various operations of a method 1200 for radar image formation within a distributed network, in accordance with an example implementation of the present disclosure. As shown at block 1202, the method includes receiving, from a radar antenna, successive pulses of radio waves transmitted in an environment of a target. The method also includes defining, from the successive recorded echoes, an array of data elements representing a density of a reflective surface of the target at each of a plurality of locations within the environment, as shown at block 1204. The method also includes partitioning the array into a plurality of subarrays based at least in part on a predefined array partitioning scheme, as shown in block 1206. The method also includes transmitting the plurality of subarrays to respective nodes of a plurality of nodes, as shown in block 1208. Each node of the plurality of nodes is configured to apply at least one algorithmic transform to the plurality of subarrays and determine respective portions of a volume of space occupied by the target based thereon. The respective portions are then combinable to determine the volume of space and thereby form an image of the target.

Figure 12B:
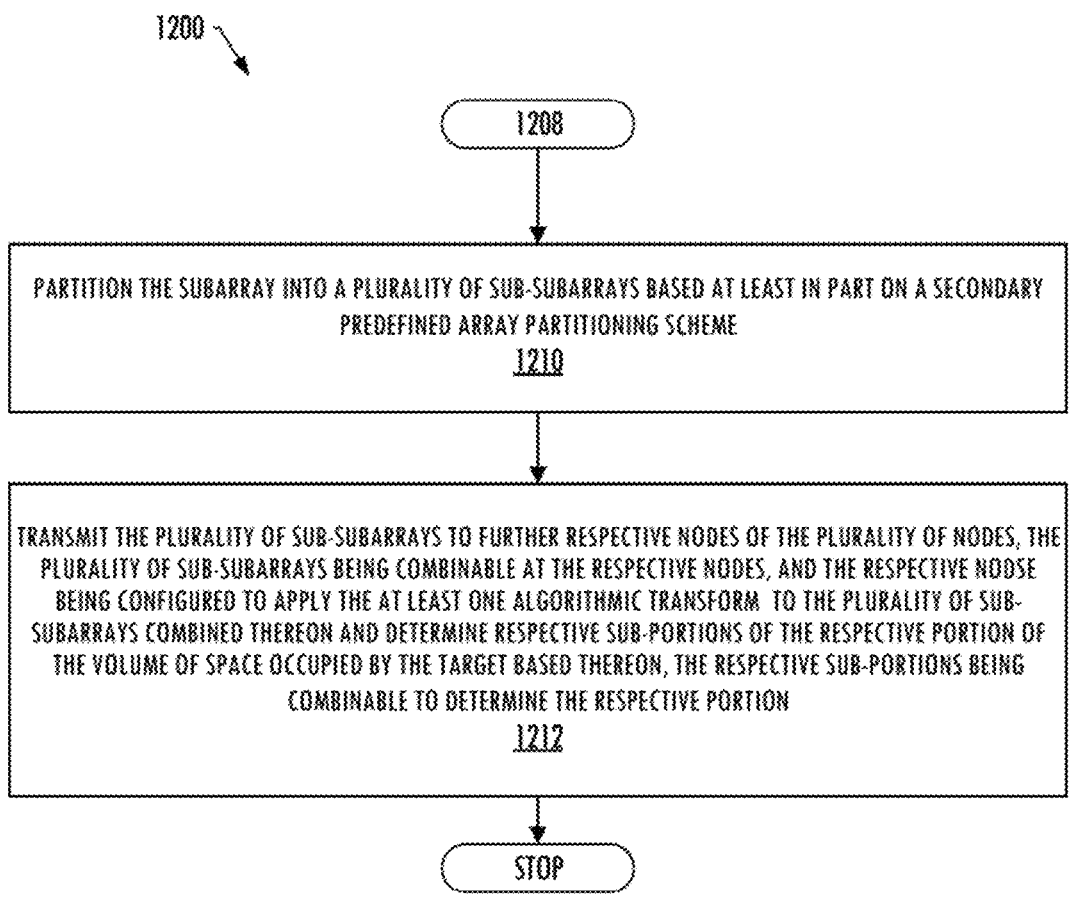
FIG. 12B is a flow diagram further illustrating various operations of the method of FIG. 12A, according to example implementations of the present disclosure.

FIG. 12B further illustrates the method 1200 for radar image formation within a distributed network according to some example implementations of the present disclosure. The method also includes partitioning the subarray into a plurality of sub-subarrays based at least in part on a secondary predefined array partitioning scheme, as shown at block 1210. The method also includes transmitting the plurality of sub-subarrays to further respective nodes of the plurality of nodes, as shown at block 1212. The plurality of sub-subarrays are combinable with various other sub-sub-arrays at the respective nodes, and the respective nodes are configured to apply the at least one algorithmic transform to the plurality of sub-subarrays combined thereon, and determine respective sub-portions of the respective portion of the volume of space occupied by the target based thereon. The respective sub-portions are combinable to determine the respective portion.

As previously mentioned, example implementations of the present disclosure may be utilized in conjunction with a variety of other applications including signal processing, tomography, large scale simulations, discrete simulations, finite element analysis, machine learning techniques, and/or other applications that require processing large, multi-dimensional arrays. In these examples, the method generally includes receiving a data input, and defining, from the data input, an array of data elements. The method also includes partitioning the array into a plurality of subarrays based at least in part on a predefined array partitioning scheme, and transmitting the plurality of subarrays to respective nodes of a plurality of nodes. Each node of the plurality of nodes is configured to apply at least one algorithmic transform or another suitable algorithm to the plurality of subarrays and determine respective results. The respective results are then combinable for further analysis and/or processing. In these examples, the data arrays represent various types of information. For example, within the context of simulation modeling, the data array represents at least surface reflectivity (e.g., light, sound), temperature, pressure, or the like within an environment. For example, within the context of a discrete three-dimensional thermal simulation, temperature is represented as a three-dimensional array.

According to example implementations of the present disclosure, the system 100 and its subsystems and/or components including the radar antenna 102, processing system 104, and/or distributed network 106 of the plurality of nodes 108 and the subcomponents thereof are implemented by various means. Means for implementing the systems, subsystems and their respective elements include hardware, alone or under direction of one or more computer programs from a computer-readable storage medium.

In some examples, one or more apparatuses are provided that are configured to function as or otherwise implement the systems, subsystems, tools and respective elements shown and described herein. In examples involving more than one apparatus, the respective apparatuses are connected to or otherwise in communication with one another in a number of different manners, such as directly or indirectly via a wired or wireless network or the like.

Figure 13:
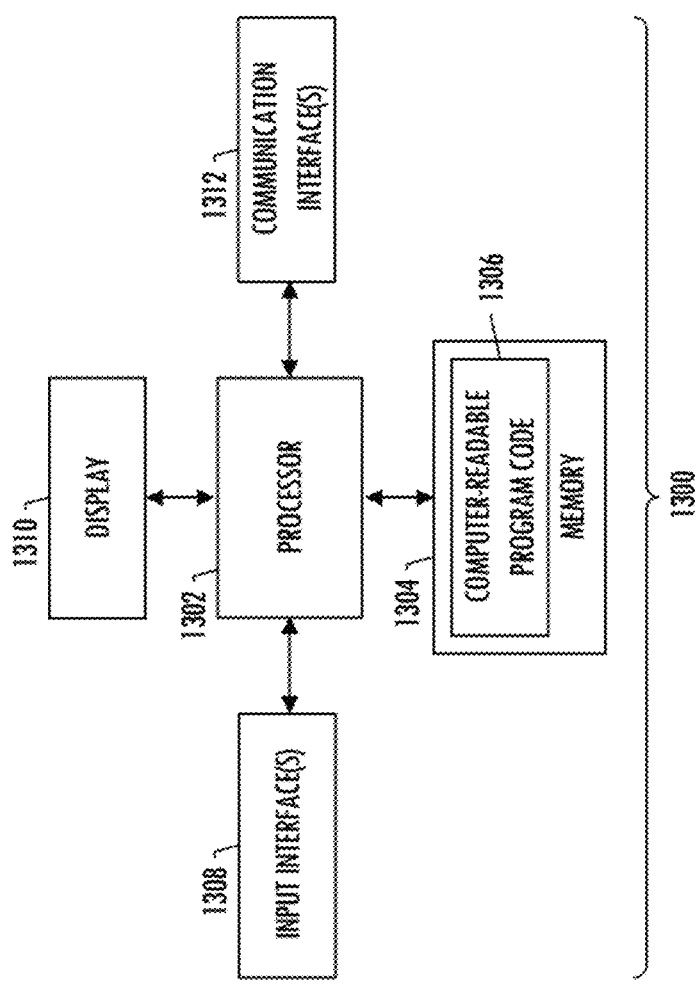
FIG. 13 illustrates an apparatus according to example implementations of the present disclosure.

FIG. 13 illustrates an apparatus 1300 that is configured to implement the processing system 104 or node 106 according to some example implementations of the present disclosure. Generally, an apparatus of example implementations of the present disclosure comprises, includes or is embodied in one or more fixed or portable electronic devices. Examples of suitable electronic devices include a smartphone, tablet computer, laptop computer, desktop computer, workstation computer, server computer or the like. The apparatus includes one or more of each of a number of components such as, for example, a processor 1302 (e.g., processor unit) connected to a memory 1304 (e.g., storage device).

The processor 1302 is generally any piece of computer hardware that is capable of processing information such as, for example, data, computer programs and/or other suitable electronic information. The processor is composed of a collection of electronic circuits some of which are packaged as an integrated circuit or multiple interconnected integrated circuits (an integrated circuit at times more commonly referred to as a "chip"). In some examples, the processor is configured to execute computer programs, which are stored onboard the processor or otherwise stored in the memory 1304 (of the same or another apparatus).

In some implementations, the processor 1302 is a number of processors, a multi-processor core or some other type of processor, depending on the particular implementation. Further, in some examples, the processor is implemented using a number of heterogeneous processor systems in which a main processor is present with one or more secondary processors on a single chip. As another illustrative example, the processor is a symmetric multi-processor system containing multiple processors of the same type. In yet another example, the processor is embodied as or otherwise include one or more application-specific integrated circuits (ASICs), field-programmable gate arrays (FPGAs) or the like. Thus, although the processor is capable of executing a computer program to perform one or more functions, the processor of various examples is capable of performing one or more functions without the aid of a computer program.

The memory 1304 is generally any piece of computer hardware that is capable of storing information such as, for example, data (e.g., archive 1306, table 1308), computer programs such as computer-readable program code 1306, and/or other suitable information either on a temporary basis and/or a permanent basis. In some implementations, the memory includes volatile and/or non-volatile memory, and is fixed or removable. Examples of suitable memory include random access memory (RAM), read-only memory (ROM), a hard drive, a flash memory, a thumb drive, a removable computer diskette, an optical disk, a magnetic tape or some combination of the above. In some examples, optical disks include compact disk-read only memory (CD-ROM), compact disk-read/write (CD-R/W), DVD or the like. In various instances, the memory is referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein generally refers to a computer-readable storage medium or computer-readable transmission medium.

In addition to the memory, in some implementations, the processor is also connected to one or more interfaces for displaying, transmitting and/or receiving information. In some examples, the interfaces include one or more input interfaces 1308 (e.g., user input interfaces), a display 1310, and/or communications interface 412 (e.g., communications unit). In some of these examples, the input interfaces 1308 are wired or wireless, and are configured to receive information from a user into the apparatus, such as for processing, storage and/or display. Suitable examples of input interfaces include a microphone, image or video capture device, keyboard or keypad, joystick, touch-sensitive surface (separate from or integrated into a touchscreen), biometric sensor or the like. In some examples, the input interfaces further include one or more interfaces for communicating with peripherals such as printers, scanners or the like.

The display 1310 is configured to present or otherwise display information to a user, suitable examples of which include a liquid crystal display (LCD), light-emitting diode display (LED), plasma display panel (PDP) or the like. The communications interface 1312 is configured to transmit and/or receive information, such as to and/or from other apparatus(es), network(s) or the like. In some examples, the communications interface are configured to transmit and/or receive information by physical (wired) and/or wireless communications links. Examples of suitable communication interfaces include a network interface controller (NIC), wireless NIC (WNIC) or the like.

As indicated above, in some examples, program code instructions are stored in memory, and executed by a processor, to implement functions of the systems, subsystems and their respective elements described herein. As will be appreciated, in some of these examples, any suitable program code instructions is loaded onto a computer or other programmable apparatus from a computer-readable storage medium to produce a particular machine, such that the particular machine becomes a means for implementing the functions specified herein. These program code instructions are also stored in a computer-readable storage medium that can direct a computer, a processor or other programmable apparatus to function in a particular manner to thereby generate a particular machine or particular article of manufacture. The instructions stored in the computer-readable storage medium produces an article of manufacture, where the article of manufacture becomes a means for implementing functions described herein. In some examples, the program code instructions are retrieved from a computer-readable storage medium and loaded into a computer, processor or other programmable apparatus to configure the computer, processor or other programmable apparatus to execute operations to be performed on or by the computer, processor or other programmable apparatus.

In some implementations, retrieval, loading and execution of the program code instructions is performed sequentially such that one instruction is retrieved, loaded and executed at a time. In some example implementations, retrieval, loading and/or execution is performed in parallel such that multiple instructions are retrieved, loaded, and/or executed together. Execution of the program code instructions produces a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 1300 includes a processor 1302 and a computer-readable storage medium or memory 1304 coupled to the processor, where the processor is configured to execute computer-readable program code 1306 stored in the memory. It will also be understood that one or more functions, and combinations of functions, are implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as set forth in some of the appended claims. Although specific terms are employed herein, they are used in a generic and descriptive sense only and not for purposes of limitation.

What is claimed is:

1. A system for radar image formation within a distributed network, the system comprising:
    a radar antenna configured to receive successive echoes of a plurality of pulses of radio waves transmitted in an environment of a target;
    a processing system operatively coupled to the radar antenna and configured to define, from the successive echoes, an array of data elements representing a density of a reflective surface of the target at each of a plurality of locations within the environment, and partition the array into a plurality of subarrays based at least in part on a predefined array partitioning scheme, wherein the processing system is further configured to define the array in which each of the data elements is indexed based on a respective number corresponding to a respective one of the successive echoes received one-by-one in a sequence by the radar antenna; and
    a respective node of a plurality of nodes configured to receive and apply at least one algorithmic transform to a respective subarray of the plurality of subarrays, and determine a respective portion of a volume of space occupied by the target based thereon, the respective portion being combinable with other respective portions to determine the volume of space and thereby form an image of the target.

2. The system of claim 1, wherein the processing system is further configured to apply motion compensation, range interpolation or azimuth interpolation to the successive echoes and thereby produce reformatted successive echoes, and define the array from the reformatted successive echoes.

3. The system of claim 1, wherein the processing system is further configured to partition the array into the plurality of subarrays each of which includes data elements of the array, and two or more of which include common data elements of the array such that the two or more at least partially overlap.

4. The system of claim 1, wherein the respective node is further configured to:
    partition the subarray into a plurality of sub-subarrays based at least in part on a secondary predefined array partitioning scheme; and
    transmit the plurality of sub-subarrays to further respective nodes of the plurality of nodes configured to apply the at least one algorithmic transform to the plurality of sub-subarrays and determine respective sub-portions of the respective portion of the volume of space occupied by the target based thereon, the respective sub-portions being combinable to determine the respective portion.

5. The system of claim 1, wherein the respective node is further configured to apply the at least one algorithmic transform in parallel with further respective nodes configured to receive further subarrays of the plurality of subarrays and simultaneously determine respective portions of the volume of space occupied by the target.

6. The system of claim 1, wherein the at least one algorithmic transform includes at least one of a warping transform, an autofocus transform, or a Fast Fourier transform (FFT), and the FFT includes at least one of a range transform or azimuth transform.

7. The system of claim 1, wherein each of the plurality of subarrays is stored on a different node of the plurality of nodes.

8. The system of claim 1, wherein at least one subarray of the plurality of subarrays is defined by a shape different from other subarrays of the plurality of subarrays, and wherein at least one node of the plurality of nodes has a higher computational capacity than other nodes of the plurality of nodes, the at least one node configured to receive and apply at least one algorithmic transform to the at least one subarray.

9. The system of claim 1, wherein the predefined array partitioning scheme includes both a row-wise partitioning scheme and a column-wise partitioning scheme.

10. An apparatus for radar image formation within a distributed network, the apparatus comprising:
 a processor;
 at least one communications interface coupled to the processor and configured to receive, from a radar antenna, successive echoes of a plurality of pulses of radio waves transmitted in an environment of a target;
 a memory storing executable instructions that, in response to execution by the processor, cause the apparatus to at least:
  define, from the successive echoes, an array of data elements representing a density of a reflective surface of the target at each of a plurality of locations within the environment, wherein the apparatus is further caused to define the array in which each of the data elements is indexed based on a respective number corresponding to a respective one of the successive echoes received one-by-one in a sequence by the radar antenna;
  partition the array into a plurality of subarrays based at least in part on a predefined array partitioning scheme; and
  transmit the plurality of subarrays to respective nodes of a plurality of nodes configured to apply at least one algorithmic transform to the plurality of subarrays and determine respective portions of a volume of space occupied by the target based thereon, the respective portions being combinable to determine the volume of space and thereby form an image of the target.

11. The apparatus of claim 10, wherein the apparatus is further caused to apply motion compensation, range interpolation or azimuth interpolation to the successive echoes and thereby produce reformatted successive echoes, and define the array from the reformatted successive echoes.

12. The apparatus of claim 10, wherein the apparatus is further caused to partition the array into the plurality of subarrays each of which includes data elements of the array, and two or more of which include common data elements of the array such that the two or more at least partially overlap.

13. The apparatus of claim 10, wherein the apparatus is further caused to transmit the plurality of subarrays to the respective nodes, a node of the plurality of nodes being configured to at least:
 receive a subarray of the plurality of subarrays;
 partition the subarray into a plurality of sub-subarrays based at least in part on a secondary predefined array partitioning scheme; and
 transmit the plurality of sub-subarrays to further respective nodes of the plurality of nodes configured to apply the at least one algorithmic transform to the plurality of sub-subarrays and determine respective sub-portions of a respective portion of the volume of space occupied by the target based thereon, the respective sub-portions being combinable to determine the respective portion.

14. The apparatus of claim 10, wherein the apparatus is further caused to transmit the plurality of subarrays to the respective nodes configured to apply the at least one algorithmic transform in parallel and simultaneously determine the respective portions of the volume of space occupied by the target.

15. The apparatus of claim 10, wherein the at least one algorithmic transform includes at least one of a warping transform, an autofocus transform, or a Fast Fourier transform (FFT), and the FFT includes at least one of a range transform or azimuth transform.

16. A method for radar image formation within a distributed network the method comprising:
 receiving, from a radar antenna, successive recorded echoes of a plurality of pulses of radio waves transmitted in an environment of a target;
 defining, from the successive recorded echoes, an array of data elements representing a density of a reflective surface of the target at each of a plurality of locations within the environment, further including defining the array in which each of the data elements is indexed based on a respective number corresponding to a respective one of the successive recorded echoes received one-by-one in a sequence by the radar antenna;
 partitioning the array into a plurality of subarrays based at least in part on a predefined array partitioning scheme; and
 transmitting the plurality of subarrays to respective nodes of a plurality of nodes configured to apply at least one algorithmic transform to the plurality of subarrays and determine respective portions of a volume of space occupied by the target based thereon, the respective portions being combinable to determine the volume of space and thereby form an image of the target.

17. The method of claim 16, wherein the method further includes applying motion compensation, range interpolation or azimuth interpolation to the successive recorded echoes and thereby producing reformatted successive recorded echoes, and defining the array from the reformatted successive recorded echoes.

18. The method of claim 16, wherein the method further includes partitioning the array into the plurality of subarrays each of which includes data elements of the array, and two or more of which include common data elements of the array such that the two or more at least partially overlap.

19. The method of claim 16, further comprising, at the respective node:
 partitioning the subarray into a plurality of sub-subarrays based at least in part on a secondary predefined array partitioning scheme; and
 transmitting the plurality of sub-subarrays to further respective nodes of the plurality of nodes configured to apply the at least one algorithmic transform to the plurality of sub-subarrays and determine respective sub-portions of the respective portion of the volume of space occupied by the target based thereon, the respective sub-portions being combinable to determine the respective portion.

20. The method of claim 16, wherein the method further includes applying the at least one algorithmic transform in parallel with further respective nodes configured to receive further subarrays of the plurality of subarrays and simultaneously determine respective portions of the volume of space occupied by the target.

21. The method of claim 16, wherein the at least one algorithmic transform includes at least one of a warping transform, an autofocus transform, or a Fast Fourier transform (FFT), and the FFT includes at least one of a range transform or azimuth transform.

\* \* \* \* \*